July 10, 1951
A. H. SCHOOLEY
2,559,666
DOUBLE APERTURE GENERATOR
Filed April 23, 1943
2 Sheets-Sheet 1
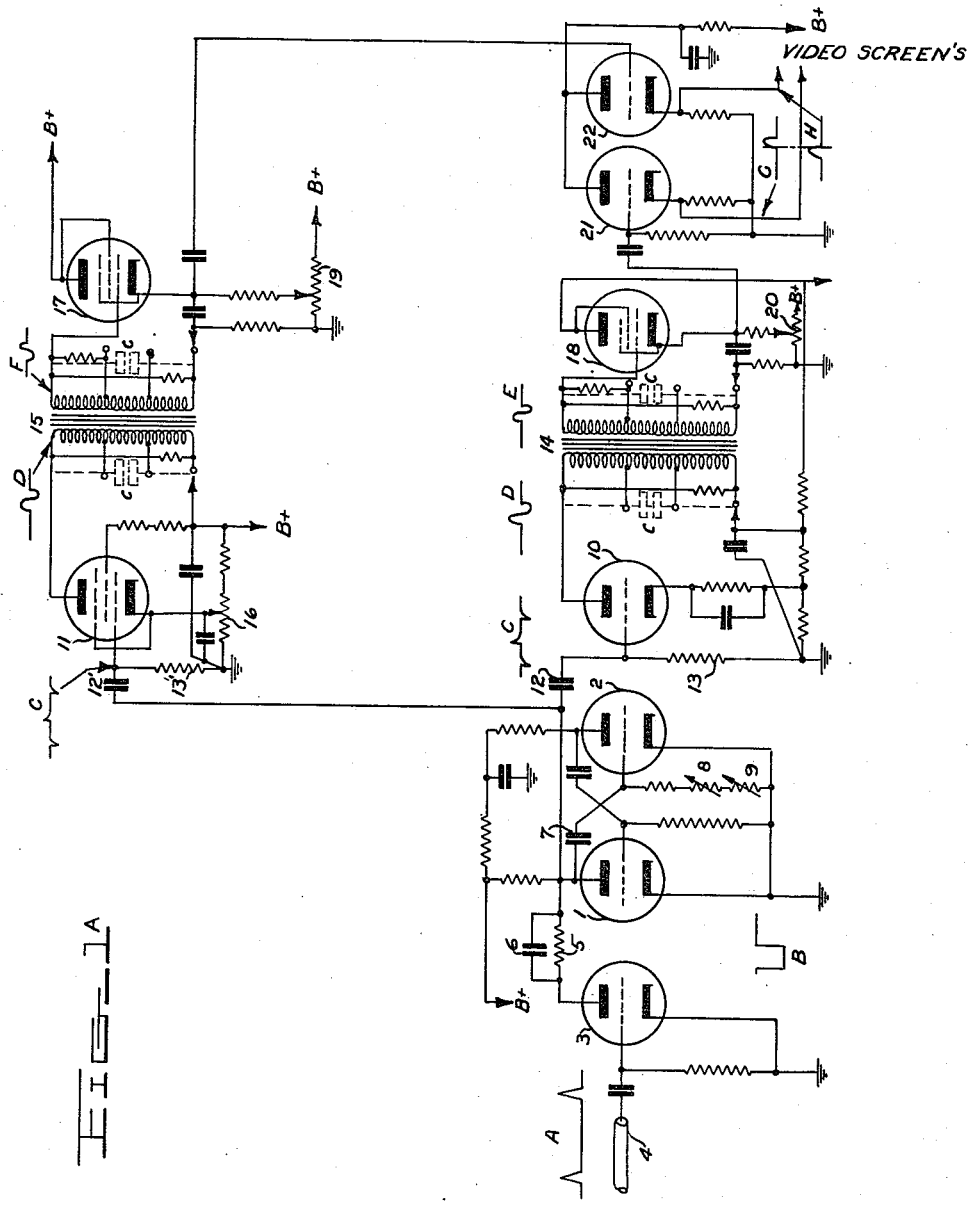
Inventor
ALLEN H. SCHOOLEY
By
Attorney

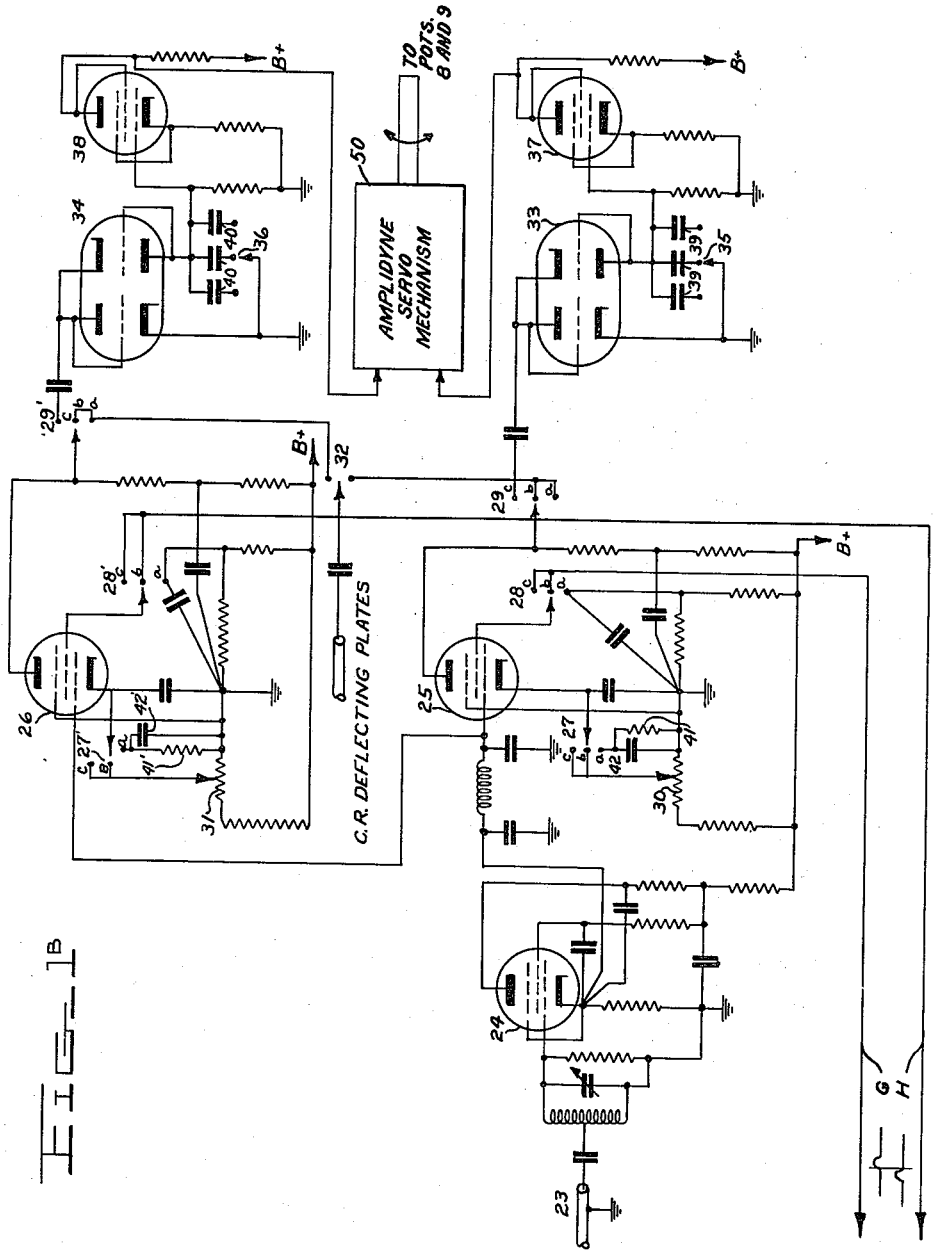

Patented July 10, 1951

2,559,666

UNITED STATES PATENT OFFICE 2,559,666

DOUBLE APERTURE GENERATOR

Allen H. Schooley, Washington, D. C.

Application April 23, 1943, Serial No. 484,151

15 Claims. (Cl. 343—7)

(Granted under the act of March 3, 1883, as amended April 30, 1928; 370 O. G. 757)

This invention relates broadly to a means for enabling radio echo apparatus to be used as a means for automatically following the changing range of a remote obstacle and more particularly to a means for generating a pair of time abutted energy pulses having both adjustable time delay and pulse width means.

In general a great many of the present automatic range and follow up systems utilize a pair of equal time abutted energy pulses occurring in alternate sequence with the transmitted pulses for alternately unblocking a pair of reception channels in such a manner that one half of the reflected energy flows through one channel and the other half of the reflected energy passes through the other channel thereby causing equal outputs to occur from both channels when the common or adjacent edge of the abutted pulses center the echo on a time axis. Thus when this condition exists an accurate measurement of the obstacle range is obtained, but as the obstacle position changes the time occurrence of the reflected energy changes and more echo energy flows through one channel than the other thereby causing a differential output from the two channels. This output is generally used to actuate a means for causing said abutted pulses to move along the time axis to again center the echo and thereby cause equal outputs to again occur from the two channels.

It is an object of this invention to provide a means for generating a pair of time abutted energy pulses having a means for regulating their time occurrence over a relatively large time interval.

It is another object of this invention to provide a means for generating a pair of time abutted energy pulses having a means for regulating the time length of each pulse.

It is another object of this invention to provide a means for automatically following the changing range of a moving target.

It is another object of this invention to provide a means for eliminating all but a desired echo from a pulse receiver.

Other objects of the present invention will become apparent upon a careful consideration of the following description taken together with the accompanying drawings, Figures 1A and 1B of which represent a schematic detailed diagram of a preferred embodiment of the present invention.

Turning in greater detail to the drawing, I have provided in Fig. 1A a split pulse generator comprising a multivibrator composed of triodes 1 and 2 and keyed by tube 3 in synchronism with the pulse transmitter (not shown here). A coaxial line 4 connecting, for example, the keyer of the pulse transmitter to the tube 3 provides the synchronizing keying voltage for the split pulse generator. An arbitrary number of miniature voltage oscillograms are drawn in throughout the detailed diagram with reference to the voltages at the various specified points in the diagram. As the pulse transmitter is keyed a positive voltage pulse, as shown in oscillogram A is applied to the tube 3 thereby causing a sudden surge of plate current to flow and consequently drive the anode voltage of triode 1 sharply negative in synchronism with the keying of the transmitter. A quench circuit comprising parallel resistance 5 and capacitance 6 connecting the anode of triode 3 to the anode of triode 1 further insures a steep drop in anode voltage of triode 1. This sharp drop in voltage charges condenser 7 negatively thereby biasing triode 2 to cut-off over a period of time proportional to the settings of the grid resistances 8 and 9. Condenser 7 then begins its exponential discharge to a point where triode 2 conducts and consequently the anode voltage of triode 1 returns sharply to normal and remains there until tube 3 is again keyed by the pulse transmitter. In other words the multivibrator is of the low frequency type generator having the necessary time constant circuits to enable the multivibrator to be locked in synchronism with the pulse transmitter. A more complete understanding of the variations in anode voltages of triode 1 with respect to time may be obtained from the oscillogram B. This voltage wave represents the output from the mutivibrator and is fed into a pair of parallel class "B" amplifiers 10 and 11 through separate differentiating circuits comprising condensers 12, 12' and resistance 13, 13'. The function of these differentiating circuits is to convert the substantially square wave voltage output of the multivibrator into a pair of time spaced voltage pulses as shown in the oscillogram C. This type of voltage wave is obtained from the square wave voltage output of the multivibrator by choosing small values of constants in the differentiating circuits thereby allowing condensers 12, 12' to pass current only when there is a change in voltage. Consequently the sharp drop in voltage at the anode of triode 1 will produce a negative pulse in oscillogram C while the sharp rise in voltage will produce the positive pulse. It will be noted that potentiometers 8 and 9 control the time interval between the keying of the pulse transmitter and the occurrence of the positive pulse in oscillogram C since they control the time of reduced anode voltage of triode 1. Thus the positive pulse of oscillogram C may be used to occur at any selected time between successive transmitted pulses by adjustment of potentiometers 8 and 9. The class "B" amplifiers 10 and 11 are biased so as to allow only positive inputs to effect their plate current. Therefore a sudden surge of current will flow through the primary windings of the multiple tap transformers 14 and 15 responsive to the positive pulse outputs of the differentiating circuits. This surge of current produces a substantially single cycle damped voltage wave as shown in oscillogram D. The period of the single cycle wave generated in the primary windings of the transformers is controlled by the natural period of the transformer itself which includes the distributed capacitance C. The amplitudes of the waves, however, are controlled by the bias on the amplifiers 10 and 11. The bias of tube 11 is regulated equal to that of tube 10 by the potentiometer 16. The secondary windings of the transformers 14 and 15 are reversed in polarity so that the voltage output of one transformer is 180 degrees out of phase with respect to the voltage output of the other transformer as shown in the oscillograms E and F. These voltage signals are fed into a pair of clipping amplifiers 17 and 18 which are biased so as to eliminate the negative grid swings thereby producing a rectified pulse output from each amplifier 17 and 18, one occurring immediately after the other or in abutted relation on a common time axis since their inputs and outputs are 180° out of phase. The outputs of the two clipping amplifiers 17 and 18 are taken from the cathode circuits and fed into a pair of cathode followers 21 and 22 the outputs of which are also taken from the cathode circuits and are two positive abutted pulses as shown in oscillograms G and H. These two pulses are fed to the screen grids of a pair of video amplifiers (Fig. 1B) in the receiver as will be discussed hereinafter. The variable taps on the transformers 14 and 15 control the natural period of the transformers and therefore provide a means for controlling the width of the pulse outputs. Potentiometers 19 and 20 also control the pulse width since they control the bias of the clipping amplifiers 17 and 18 and consequently the usable amplitude of the input voltage which varies inversely in width to amplitude. It, therefore, becomes apparent that the potentiometers 8 and 9 can be regulated so as to cause the two abutted positive pulses of the oscillograms G and H to occur at any selected time between successive transmitted pulses since the positive pulse of the oscillogram C is responsible for the single cycle voltage in the transformers. Transformers 14 and 15 together with potentiometers 19 and 20 regulate the width of each of the abutted pulses.

Turning now in detail to the detector and video stages of a receiver which are also included in the drawing, I have provided in Fig. 1B a coaxial line 23 connecting the output of the intermediate frequency stage of the receiver (not shown here) to the input of the detector 24. The output of the detector as taken from the cathode circuit is fed into a pair of video amplifiers 25 and 26 which comprise what may be referred to as a split video channel section. The anode, the cathode and the screen grid of both video amplifiers contain a connection to the contact making member of separate multiple throw switches 27, 27'; 28, 28'; and 29, 29'. The b and c positions of each cathode switch 27, 27' are tied together and connected to individual potentiometers 30 and 31 for use in regulating the bias of its respective video amplifier and thereby control the inherent noise level, and also to prevent the pulse outputs from the cathode followers 21 and 22 from causing a heavy plate current drain upon striking the screen grids of the video amplifiers 25 and 26. The remaining or a position of each cathode switch is connected to a self bias circuit comprising resistances 41 and 41' and capacitors 42 and 42', the constants of which are chosen so as to provide normal operation of each amplifier. The b and c position of each screen grid switch 28 and 28' are tied together and each connected to the output of a separate one of the cathode follower tubes 21 and 22 so that both video amplifiers are maintained in a normally blocked condition due to reduced screen grid voltage except during the occurrence of the positive outputs from the cathode followers which supply the video amplifiers with the necessary screen voltage and consequently alternately unblock first one video channel and then the other. The a position of each screen grid switch is connected directly to a source of rated screen voltage so as to render both video amplifiers normally conducting. The a and b positions of each anode switch 29 and 29' are tied together and each connected to separate poles of a single pole double throw switch 32. The contact making arm of switch 32 is connected to one set of deflecting plates of a cathode ray tube. Consequently with all multiple pole switches held in the a position and switch 32 in either position normal operation of the receiver will ensue: i. e., the cathode ray tube will show an indication of the transmitted pulse followed by the time base sweep line and a series of echoes. This condition of operation exists because of the fact that rated voltage is applied to the screen and control grids thereby unblocking both video channels. Switch 32 merely shifts the driving power for the deflecting plates of the cathode ray tube from one video channel to the other. With all multiple switches held in b position and switch 32 in either position a range aperturing condition of operation will exist; i. e., the transmitted pulse and all ensuing echoes except those occurring during the time that one cathode follower 21 or 22 depending on which video channel is used is delivering an output pulse will be eliminated. This condition exists because of the fact that when screen grid switches 28 and 28' and cathode switches 27 and 27' are in position b the rated screen and control grid voltage is removed and the tube is inherently blocked and, therefore, requires the positive pulse output from the cathode followers to momentarily unblock the video amplifiers. Consequently by varying potentiometers 8 and 9 the time of occurrence of the output of the cathode followers can be varied in such a manner that any one echo or group of echoes, depending upon the width of the output pulse from the cathode followers, can be viewed across the screen of the cathode ray tube. It therefore becomes obvious that if potentiometers 8 and 9 were graduated in suitable range units a high degree of range measurement could be obtained directly from the potentiometers themselves. The c position of each anode switch 29 and 29' is connected directly to a separate double diode integrator 33 and 34. The output from each integrator is taken from one anode and coupled to the input of a direct current amplifier 37 and 38. The coupling circuit between each integrator and its respective direct current amplifier is provided with an adjustable time constant thereby allowing both direct current amplifiers to follow slow or rapid changes in outputs from their respective video amplifiers 25 and 26. Each time delay means comprises a multiple throw switch 35 and 36 having a plurality of condensers 39 and 40 connected thereto. The differential output of the direct current amplifiers 37 and 38 may be fed into an amplidyne servo mechanism 50 the armature of which is mechanically coupled to the potentiometers 8 and 9 thereby providing a means for automatically following the range and rate of change of range of a remote obstacle. Thus with all the multiple throw switches held in a c position the automatic range and follow up condition of operation will exist; i. e., both video channels are normally maintained in a blocked condition except when the cathode followers 21 and 22 deliver a positive pulse to their respective video amplifier 25 and 26 thereby alternately unblocking first one channel and then the other. The received signal is fed through each video channel and its respective integrator and direct current amplifier to the amplidyne servo mechanism. Consequently as the signal of one channel exceeds that of the other a differential output from the two direct current amplifiers 37 and 38 will exist. This output will actuate the amplidyne servo mechanism and drive the potentiometer 8 and 9 in the proper direction thereby realigning the output of the cathode followers with the incoming signal. It, therefore, becomes obvious that a high degree accuracy in range measurement may be obtained when the outputs from the direct current amplifiers 37 and 38 are equal or when the common edge of the abutted pulses occurring from the cathode followers 21 and 22 center the echo thereby causing one-half of the echo energy to pass through one video channel and the other half of the echo to pass through the other video channel. Many changes could be affected in the present circuit, for example, a zero centering meter could be connected to the output of the direct current amplifiers to indicate range without departing from the spirit of the invention. Therefore, this invention is not to be restricted except insofar as is necessitated by the prior art and the spirit of the appended claims.

The invention described herein may be manufactured and used by or for the Government of the United States of America for governmental purposes without the payment of any royalties thereon or therefor.

I claim:

1. A method of alternately unblocking two channels of reception in the receiver of a radio ranging system at the proper time to allow one half of a reflected signal to pass through one channel and the other half of the same reflected signal to pass through the other channel, which includes the steps of utilizing a small portion of each transmitted pulse from the system to produce a time delaye single cycle alternating voltage in each of two amplification channels and in phase opposition, eliminating in both amplification channels the same half cycle of said alternating voltage, utilizing the output from each of said two amplification channels to unblock a respective reception channel of said receiver.

2. A method of alternately unblocking two channels of reception in the receiver of a radio ranging system at the proper time to allow one half of a reflected signal to pass through one channel and the other half of the same reflected signal to pass through the other channel, which includes the steps of utilizing a small portion of each transmitted pulse from the system to produce a time delayed single cycle alternating voltage in each of two amplification channels in phase with each other, inverting the phase of the voltage in one amplification channel, eliminating in both amplification channels the same half cycle of said alternating voltage and utilizing the output from each of said two amplification channels to unblock a respective reception channel of said receiver.

3. A means for producing a pair of time abutted energy pulses, comprising a means for producing a single cycle alternating voltage in each of two channels of amplification in phase opposition, signal clipping means connected to the output of each of said channels operative to pass signals of only one sense, a means for regulating the width of the pulse output from each of said signal clipping means and an amplifying means connected to the output of each of said signal clipping means.

4. A means for producing a pair of time abutted energy pulses, comprising a means for producing a single cycle voltage signal in each of two channels of amplification and in phase with each other, a means for inverting the phase of the voltage signal in one of said channels, signal clipping means connected to the output of each of said channels operative to pass signals of only one sense, a means for regulating the width of the pulse output from each of said signal clipping means and an amplifying means connected to the output of each of said signal clipping means.

5. A means of generating a pair of time abutted energy pulses in alternate sequence with a first series of energy pulses, comprising a means responsive to each pulse of the first series to produce a delayed single cycle alternating voltage signal in each of two amplification channels and in phase opposition, signal clipping means connected to the output of each of said channels operative to pass signals of only one sense, a means for regulating the width of the pulse output from each of said signal clipping means and an amplifying means connected to the output of each of said signal clipping means.

6. A means of generating a pair of time abutted energy pulses in alternate sequence with a first series of energy pulses, comprising a means responsive to each pulse of the first series to produce a delayed single cycle alternating voltage signal in each of two amplification channels and in phase with each other, a means for inverting the phase of the voltage signal in one channel, signal clipping means coupled to the output of each of said channels operative to pass signals of only one sense, a means for regulating the width of the pulse output from each of said signal clipping means.

7. In a radio echo system comprising a pulse transmitter and a receiver having a pair of normally blocked reception channels, a means for alternately unblocking said channels at the proper time to allow one half of the energy of an echo to pass through one channel and the other half of the echo energy to pass through the other of said channels, comprising a multivibrator, a means for keying said multivibrator in synchronism with said pulse transmitter, a means for converting the substantially square wave output of said multivibrator due to each keying pulse of the pulse transmitter into a pair of spaced energy pulses the first of which lies in coincidence with the transmitted pulse the second of which is timed delayed, a means for converting the latter energy pulse into a single cycle voltage in each of two amplification channels and in phase opposition, a means for eliminating the same half cycle of each of said single cycle voltages, and a means for using the output of each of said amplification channels to unblock each of said reception channels.

8. In a radio echo system comprising a pulse transmitter and a receiver having a pair of normally blocked reception channels, a means for alternately unblocking said channels at the proper time to allow one half of the energy of an echo to pass through one channel and the other half of the echo energy to pass through the other of said channels, comprising a multivibrator, a means for keying said multivibrator in synchronism with said pulse transmitter, a means for converting the substantially square wave output of said multivibrator due to each keying pulse of the pulse transmitter into a pair of spaced energy pulses the first of which lies in coincidence with the transmitted pulse the second of which is timed delayed, a means for adjusting the time delay and thereby causing the latter energy pulse to occur at any time between pulses from the transmitter, a means for converting the latter energy pulse into a single cycle voltage in each of two amplification channels and in phase opposition, a means for eliminating the same half cycle of each of said single cycle voltages, and a means for using the output of each of said amplification channels to unblock each of said reception channels.

9. In a radio echo system comprising a pulse transmitter and a receiver having a pair of normally blocked reception channels, a system of automatic ranging comprising, a pulse generator operative responsive to the pulsing of said transmitter to produce a time delayed signal pulse, said generator having incorporated therein a control means for adjustment of said time delay to correspond to the range of any selected remote object, circuit means including two amplification channels operative responsive to said time delayed signal pulse to produce a single cycle alternating voltage signal in each of said two amplification channels in phase opposition, clipping means in each of said amplification channels for eliminating the half cycle of one sense of said voltage signal, means connecting the output of each of said amplification channels to corresponding reception channels in said receiver whereby the latter are unblocked in succession responsive to the output of said amplification channels, and means including a follow-up mechanism also connecting the output of said reception channels to said time delay control means of said pulse generator, said last named means operative to maintain the output of said amplification channels centered in time with respect to the occurrence of an echo signal from said selected object.

10. In a radio echo system comprising a pulse transmitter and a receiver having a pair of normally blocked reception channels, a system of automatic ranging comprising, a pulse generator operative responsive to the pulsing of said transmitter to produce a time delayed signal pulse, said generator having incorporated therein a control means for adjustment of said time delay to correspond to the range of any selected remote object, circuit means including two amplification channels operative responsive to said time delay signal pulse to produce a single cycle voltage signal in each of said two amplification channels in phase opposition, clipping means in each of said amplification channels for eliminating the half cycle of one sense of said voltage signal, means connecting the output of each of said amplification channels to a corresponding reception channel in said receiver whereby the latter are unblocked in succession responsive to the output from said amplification channels, and means including a signal integrating circuit and a follow-up mechanism connecting the output of said reception channels to said time delay control means of said pulse generator, said last named means being operative responsive to a differential in echo signal output from said reception channels to maintain the occurrence of said echo signal and the output from said amplification channels centered in time.

11. A method of generating a pair of time abutted energy pulses which comprises the steps of, simultaneousy producing in phase opposition a critically damped oscillation in each of two signal transmission channels, and suppressing from transmission one half cycle of oscillation in each channel, the one half cycle so suppressed in each channel being of the same polarity.

12. A method of generating a pair of time abutted energy pulses in alternate sequence with a first series of energy pulses which comprises the steps of, producing responsive to the first series of pulses a second series of pulses occurring in alternation with the first series of pulses, simultaneously producing in response to each pulse of the second series and in phase opposition a critically damped oscillation in each of two signal transmission channels, and suppressing from transmission one half cycle of oscillation in each channel, the one half cycle so suppressed in each channel being of the same polarity.

13. Apparatus for producing a pair of time abutted energy pulses comprising, a pair of pulse generating channels each including a critically damped oscillatory circuit arranged for shock excitation, means applying a control pulse in parallel to said channels to produce a damped oscillation in each of said channels, means in one of said channels for inverting the phase of the damped oscillation therein with respect to the damped oscillation in the other channel, and signal clipping means coupled to the output of each of said channels operative to pass signals of only one sense.

14. Apparatus for producing a pair of time abutted energy pulses in alternate sequence with a first series of energy pulses comprising, a pair of pulse generating channels each including a critically damped oscillatory circuit arranged for shock excitation, time delay means operative responsive to each pulse of the first series to apply a time delayed control pulse in parallel to said channels to produce simultaneous damped oscillations in said channels, means in one of said channels for inverting the phase of the damped oscillation therein with respect to the damped oscillation in the other channel, and signal clipping means coupled to the output of each of said channels operative to pass signals of only one sense.

15. Apparatus for producing a pair of time abutted energy pulses in alternate sequence with a first series of energy pulses comprising, a pair of pulse generating channels each including a critically damped oscillatory circuit arranged for shock excitation, a multivibrator circuit operative responsive to each pulse of the first series to apply a time delayed control pulse in parallel to said channels to produce simultaneous damped oscillations in said channels, means in one of said channels for inverting the phase of the damped oscillation therein with respect to the damped oscillation in the other channel, and signal clipping means coupled to the output of each of said channels operative to pass signals of only one sense.

ALLEN H. SCHOOLEY.

REFERENCES CITED

The following references are of record in the file of this patent:

UNITED STATES PATENTS

| Number | Name | Date |
| --- | --- | --- |
| 2,063,025 | Blumlein | Dec. 8, 1936 |
| 2,113,214 | Luck | Apr. 5, 1938 |
| 2,118,626 | Smith | May 24, 1938 |
| 2,139,432 | Andrieu | Dec. 6, 1938 |
| 2,166,688 | Kell | July 18, 1939 |
| 2,226,459 | Bingley | Dec. 24, 1940 |
| 2,277,000 | Bingley | Mar. 17, 1942 |
| 2,403,975 | Graham | July 16, 1946 |
| 2,408,078 | Labin | Sept. 24, 1946 |
| 2,455,265 | Norgaard | Nov. 30, 1948 |